(12) United States Patent
Nakayama et al.

(10) Patent No.: US 12,436,172 B2
(45) Date of Patent: Oct. 7, 2025

(54) CURRENT DETECTING DEVICE

(71) Applicant: Alps Alpine Co., Ltd., Tokyo (JP)

(72) Inventors: Keisuke Nakayama, Miyagi-ken (JP); Yasumasa Usuba, Miyagi-ken (JP); Satoshi Asayama, Tokyo (JP); Shinichi Tanaka, Miyagi-ken (JP); Manabu Tamura, Miyagi-ken (JP); Yuu Kumagai, Miyagi-ken (JP); Junichi Hosogoe, Miyagi-ken (JP); Tatsuya Yamaguchi, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 174 days.

(21) Appl. No.: 18/352,440

(22) Filed: Jul. 14, 2023

(65) Prior Publication Data

US 2024/0019465 A1 Jan. 18, 2024

Related U.S. Application Data

(63) Continuation of application No. PCT/JP2021/045464, filed on Dec. 10, 2021.

(30) Foreign Application Priority Data

Jan. 19, 2021 (JP) .................. 2021-006486

(51) Int. Cl.
*G01R 15/20* (2006.01)
*G01R 19/00* (2006.01)

(52) U.S. Cl.
CPC ......... *G01R 15/20* (2013.01); *G01R 19/0092* (2013.01)

(58) Field of Classification Search
CPC ... G01R 15/20; G01R 15/207; G01R 19/0092
See application file for complete search history.

(56) References Cited

U.S. PATENT DOCUMENTS 7,381,101 B2 * 6/2008 Roset ................. H01R 13/6683
439/754
8,237,435 B2 8/2012 Hashio et al.
(Continued)

FOREIGN PATENT DOCUMENTS

EP 3176590 6/2017
JP 2005-188935 A 7/2005
(Continued)

OTHER PUBLICATIONS

International Search Report and Written Opinion from corresponding International Application No. PCT/JP2021/045464, Feb. 8, 2022, 10 pgs.

*Primary Examiner* — Dominic E Hawkins
(74) *Attorney, Agent, or Firm* — Crowell & Moring LLP

(57) ABSTRACT

A current detecting device has: a bus bar through which a current under measurement flows; a fastening member for fastening an external member to the bus bar; a chassis formed integrally with the bus bar and a shield, the chassis holding the bus bar and fastening member in a mutual contact state; and a magnetic sensor placed so as to face the bus bar, the magnetic sensor being capable of detecting a magnetic field generated when the current under measurement flows through the bus bar. The bus bar has a fastening terminal portion on the same side as an end of the bus bar, the fastening terminal portion being in contact with the external member. A connection surface is provided so as to be exposed from the chassis, the connection surface being a surface through which the fastening terminal portion is brought into contact with the external member.

17 Claims, 11 Drawing Sheets

(56) References Cited

U.S. PATENT DOCUMENTS

| | | | |
|---|---|---|---|
| 11,422,165 B2 | 8/2022 | Miwa et al. | |
| 2010/0025102 A1* | 2/2010 | Nishikawa | B60R 16/0238 |
| | | | 174/535 |
| 2013/0015842 A1* | 1/2013 | Kawaguchi | G01R 15/202 |
| | | | 324/200 |
| 2013/0119975 A1* | 5/2013 | Nakajima | G01R 19/20 |
| | | | 324/117 R |
| 2015/0268278 A1* | 9/2015 | Masuda | G01R 15/207 |
| | | | 324/127 |
| 2018/0031613 A1* | 2/2018 | Nakayama | G01R 19/25 |
| 2020/0292589 A1* | 9/2020 | Kraemer | H02B 1/20 |

FOREIGN PATENT DOCUMENTS

| | | |
|---|---|---|
| JP | 2005-188945 A | 7/2005 |
| JP | 2010-78586 A | 4/2010 |
| JP | 2010-243440 | 10/2010 |
| JP | 2016-125907 A | 7/2016 |
| JP | 2016-164523 A | 9/2016 |
| JP | 2016-001168 | 1/2017 |
| JP | 2017-102024 | 6/2017 |
| WO | WO 2019/117171 A1 | 6/2019 |
| WO | WO 2019/181174 | 9/2019 |

* cited by examiner

CURRENT DETECTING DEVICE

CLAIM OF PRIORITY

This application is a Continuation of International Application No. PCT/JP2021/045464 filed on Dec. 10, 2021, which claims benefit of priority to Japanese Patent Application No. 2021-006486 filed on Jan. 19, 2021. The entire contents of each application noted above are hereby incorporated by reference.

BACKGROUND

1. Field of the Disclosure

The present disclosure relates to a current detecting device that measures a current under measurement according to a magnetic field generated when the current under measurement flows through a bus bar.

2. Description of the Related Art

To increase measurement precision of current detecting devices, there is a demand for highly precise management of the positional relationship among a magnetic sensor, a shield, and a bus bar. A bus bar module described in, for example, Japanese Unexamined Patent Application Publication No. 2016-1168, is proposed as a current detecting device in which bus bars and shields are molded integrally with a chassis formed from a resin and magnetic sensors are placed in the chassis.

The bus bar module described in Japanese Unexamined Patent Application Publication No. 2016-1168 is problematic in that during the molding of the chassis, the bus bar may deviate from a design position due to the effect of a flowing resin, the resin may not be properly filled (short mold), or a bent bus bar may be deformed due to a spring back effect. These problems may cause a deviation of the bus bar, magnetic sensor, or shield from a predetermined positional relationship and may thereby affect measurement precision.

In current detecting devices, a structure is used in which a magnetic sensor is placed at a position at which the magnetic sensor faces a bus bar. The bus bar has a fastening surface having a through-hole, through which an external terminal is fasten, at an end. The fastening surface is placed at a position at which the fastening surface overlaps the chassis. The rear surface of the fastening surface is in contact with a nut embedded in the chassis. The bus bar and external terminal are fastened to each other by inserting a bolt into through-holes formed in the external terminal and fastening surface and then screwing the bolt into the nut.

The current detecting devices have a concave portion at part of the fastening surface of the bus bar, and has an overhang portion with the concave portion embedded in the resin of the chassis. The fastening surface of the bus bar protrudes beyond the resin forming the overhand portion. Due to the overhang portion, it is possible to prevent a lift, which would otherwise occur by a spring back effect, of the bus bar with respect to the nut. If the bus bar is lifted, when the external terminal is fastened to the fastening surface with the bolt, the bus bar is pressed by an amount by which the bas bur is lifted. This may deviate the positional relationship between the bus bar and the magnetic sensor. Therefore, the overhang portion is an effective means for suppressing a reduction in measurement precision.

However, if the fastening surface and the surface of the resin of the overhang portion are flush with each other, it might occur during the molding of the chassis integrally with the bus bar that the resin from which to form the chassis flows due to, for example, variations in molding conditions and reaches the fastening surface of the bus bar. If the resin reaches the fastening surface and covers part of the fastening surface, when the external terminal is fastened to the fastening surface, an electrical connection is lost between the external terminal and the bus bar.

Further, in conventional current detecting devices, during the insert-molding of a shield into a chassis, positioning pins are used to fix the shield to the interior of a mold with. Therefore, positioning pin marks in a hole shape are left at positions, on the molded chassis, at which the positioning pins have been present. Part of the shield is exposed to the interior of the hole. When a side face of the shield is used as a portion that comes into contact with the positioning pin, this side face is exposed to the interior of the hole. The shield is formed by stamping a plate material to produce a contour shape. That is, the side face of the shield is a fracture surface (cut surface) without surface treatment being performed on the side face. Therefore, there has been the fear that if the side face of the shield is exposed to the interior of the hole, corrosion occurs from the side face. If corrosion occurs, the magnetic property of the shield is affected. This may lower measurement precision.

In addition, the structure in which shields are insert-molded into a chassis, there is a difference in thermal expansion coefficient between the shield made of a metal material and the chassis made of a resin material. Since a metal material has a larger thermal expansion coefficient than a resin material, when heat is applied, the shield is likely to more greatly expand. Therefore, due to the large expansion of the shield, a portion (molded resin portion), made of a molding resin material, of the chassis, the portion being in contact with the shield, is tensioned in a direction in which the shield expands by an amount equal to or more than the amount of expansion of the molded resin portion. Therefore, stress is exerted on the molded resin portion. On the cross sections of this molded resin portion and the shield, the cross sections being taken by cutting the chassis in the lamination direction, the shield and molded resin portion form layers in the vicinity of the center of the shield. Therefore, large stress is exerted on the molded resin portion due to a large effect of the difference in thermal expansion coefficient. When positioning pins are used to position the shield during insert-molding, a portion at which the positioning pin has been present becomes an exposed hole portion after molding. A weld line (a line, in a V-groove shape, that is formed at a portion or the like at which molding materials join together that have flowed so as to turn along both sides of the positioning pin) is likely to be formed so as to extend from this exposed hole portion. Since many portions of the weld line are vulnerable, there has been the fear that if large stress is exerted on the molded resin portion due to the difference in thermal expansion coefficient, a crack occurs along the above weld line.

SUMMARY

The present invention provides a current detecting device that has a chassis formed integrally with bus bars and shields and has measurement precision that is less likely to be lowered.

A current detecting device in a first aspect of the present disclosure has: a bus bar through which a current under measurement flows; a fastening member for fastening an external member to the bus bar; a chassis that holds the bus bar and the fastening member in a mutual contact state; and a magnetic sensor placed so as to face the bus bar, the magnetic sensor being capable of detecting a magnetic field generated when the current under measurement flows through the bus bar. The bus bar has a fastening terminal portion on the same side as an end of the bus bar, the fastening terminal portion being in contact with the external member. A connection surface is provided so as to be exposed from the chassis, the connection surface being a surface through which the fastening terminal portion is brought into contact with the external member. The fastening terminal portion has an anchor portion embedded in the chassis, the anchor portion having a surface different from the connection surface.

Thus, the anchor portion can prevent the bus bar from lifting with respect to the chassis. Since a lift is prevented, a correct positional relationship between the bus bar and the magnetic sensor is not lost, so superior detection precision is maintained and an electric connection is stabilized.

A current detecting device in a second aspect of the present disclosure has: a bus bar through which a current under measurement flows; a magnetic sensor capable of detecting a magnetic field generated when the current under measurement flows through the bus bar; a pair of shield members between which the bus bar and the magnetic sensor are interposed; and a chassis made of a resin material, the chassis being formed integrally with a first shield member of the pair of shield members, the first shield member being positioned on a side close to the bus bar. The first shield member has a base material having a metal plate-like body and also has a protecting portion made of a resin material, the protecting portion covering at least part of an end face of the base material.

Thus, since, as for the first shield member, an end face of the base material is covered by the protecting portion, when, during the integral molding of the first shield member with the chassis, the first shield member is positioned in a mold with a support pin abutting at a position at which the protecting portion is present, the base material is not exposed even if the first shield member is exposed to the inner surface of a hole, in the chassis, formed at a position at which the support pin was present. Therefore, an event is less likely to occur in which the exposed base material is corroded and the operation of the current detecting device is thereby adversely affected.

A current detecting device in a third aspect of the present disclosure has a sensor portion that has: a plate-like bus bar through which a current under measurement flows; a magnetic sensor placed so as to face the plate surface of the bus bar; a pair of shield members placed at positions between which the bus bar and the magnetic sensor are interposed from both sides of the lamination direction of the bus bar and the magnetic sensor; and a chassis composed of a molded body of a resin material. A first shield member of the pair of shield members, the first shield member being positioned on a side close to the bus bar, is insert-molded to the interior of the chassis, the first shield member being composed of a plate-like body, which is a polygon in plan view, a cutout portion being formed at each of at least two corners of the above polygon; and the chassis has at least one through-hole portion, which is partially in contact with an end face formed by the cutout portion so as to extend in the lamination direction.

Thus, a contact area between the first shield member and the support pin for the first shield member can be reduced during insert molding. Therefore, even when the first shield member has a metal plate and an end face of the metal plate is exposed to the inner surface of a hole for the current detecting device, the exposed area of the end face is small. Therefore, an event is less likely to occur in which the end face is corroded and the operation of the current detecting device is thereby adversely affected.

A current detecting device in a fourth aspect of the present disclosure has a sensor portion that has: a plate-like bus bar through which a current under measurement flows; a magnetic sensor placed so as to face the plate surface of the bus bar; a pair of shield members placed at positions between which the bus bar and the magnetic sensor are interposed from both sides of the lamination direction of the bus bar and the magnetic sensor; and a chassis composed of a molded body of a resin material. A first shield member of the pair of shield members, the first shield member being positioned on a side close to the bus bar, is a plate-like body that is insert-molded to the interior of the chassis; in the chassis, a plurality of sensor portions are arranged along a first direction parallel to the plate surface of the first shield member; the chassis has an exposure hole portion to which the plate surface of the first shield member is exposed; and the exposure hole portion is formed so as to expose the plate surface positioned at an end of the first shield member in a second direction, which is orthogonal to the first direction and is parallel to the plate surface of the first shield member.

Thus, the problem that cracks are generated along weld lines due to thermal stress is less likely to occur. In an area, immediately close to the vicinity of the end of the shield member, that is composed of only a molded resin portion and in which the shield member is not present, the resin material more smoothly flows than in an area in which the shield member is present. Therefore, even when the positioning pin is placed in the vicinity of the end of the shield member, since the resin material is sufficiently filled in the periphery of the positioning pin, a weld line with a low strength is less likely to occur. When, during insert-molding, the resin material flows into the gap between the first shield member and the bus bar along the first direction, nothing impedes or divides the flow of the resin material. Therefore, the resin material is likely to be appropriately placed in the gap.

According to the present disclosure, it is possible to suppress a reduction in measurement precision in a current detecting device that is equipped with a chassis formed integrally with bus bars and shields, and the measurement precision of which is less likely to be lowered. In a structure having an overhang portion with a concave portion embedded in the resin of the chassis, the concave portion being formed in the fastening surface of the bus bar, electrical contact stability on the fastening surface can be enhanced. Therefore, a current detecting device having measurement precision that is less likely to be lowered can be provided. Furthermore, in a current detecting device having a structure in which a shield is insert-molded into a chassis, a current detecting device can be provided that is structured so that exposure of a fracture surface, which is a side face of the shield, is suppressed to a small amount and thereby can suppress the occurrence of corrosion and can assure measurement precision for the shield. In a current detecting device having a structure in which a shield member is insert-molded into a chassis, a current detecting device can be provided that can restrain, even if a weld line is formed so as to extend from an exposed hole portion, a crack from occurring along this weld line.

DESCRIPTION OF THE EXEMPLARY EMBODIMENTS

A current detecting device according to an embodiment of the present invention will be described below in detail with reference to the drawings. In each drawing, X-Y-Z coordinates are indicated as reference coordinates. In the description below, the Z1-Z2 direction will be referred to as the up-down direction, the X1-X2 direction will be referred to as the left-right direction, and the Y1-Y2 direction will be referred to as the front-back direction. The X1-X2 direction and Y1-Y2 direction are mutually perpendicular. An X-Y plane including these directions is perpendicular to the Z1-Z2 direction. A state when the lower side (Z2 side) is viewed from the upper side (Z1 side) may be referred to as a plan view.

First Embodiment

Figure 1A:
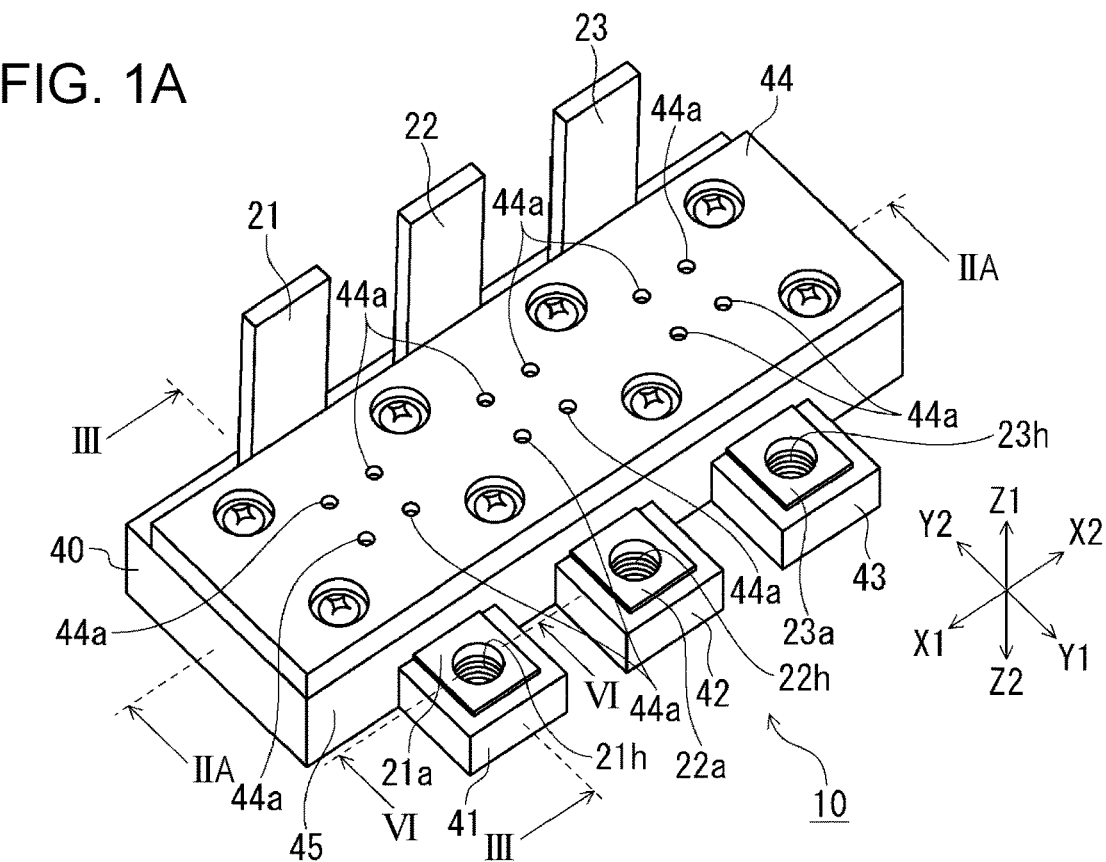
FIGS. 1A and 1B are perspective views illustrating the structure of a current detecting device according to a first embodiment.
Figure 1B:
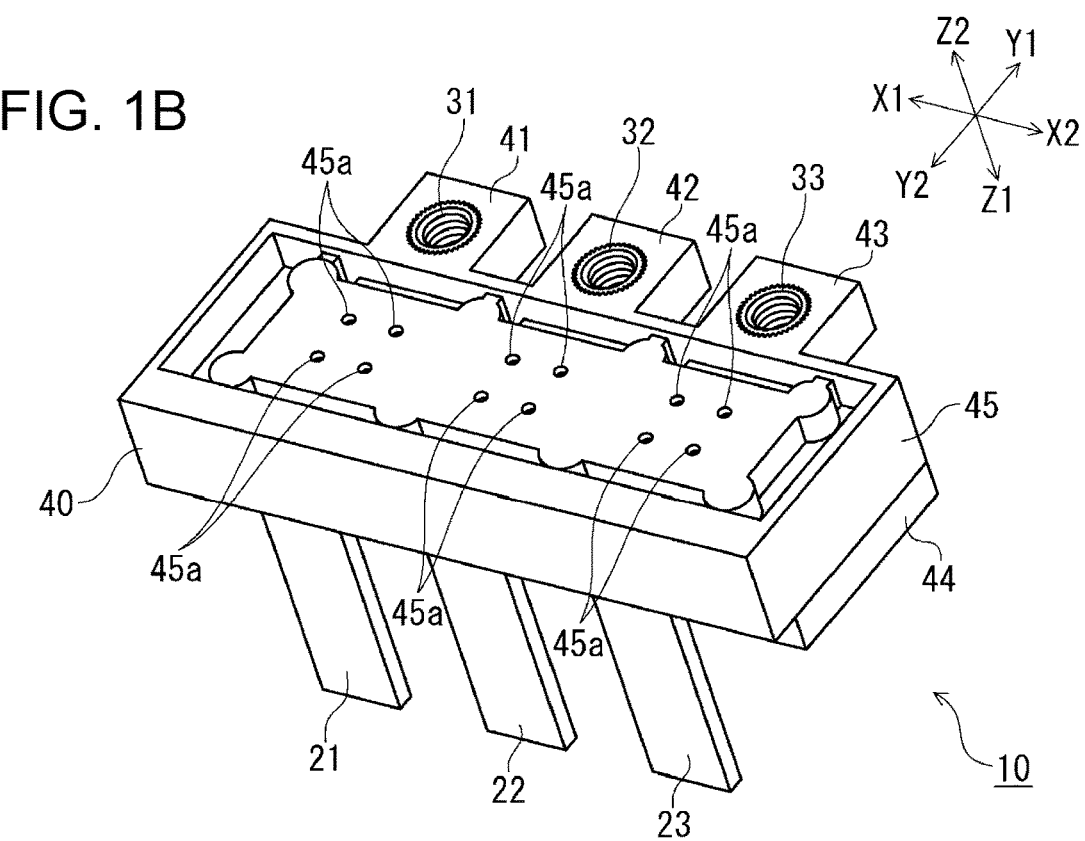
Figure 2A:
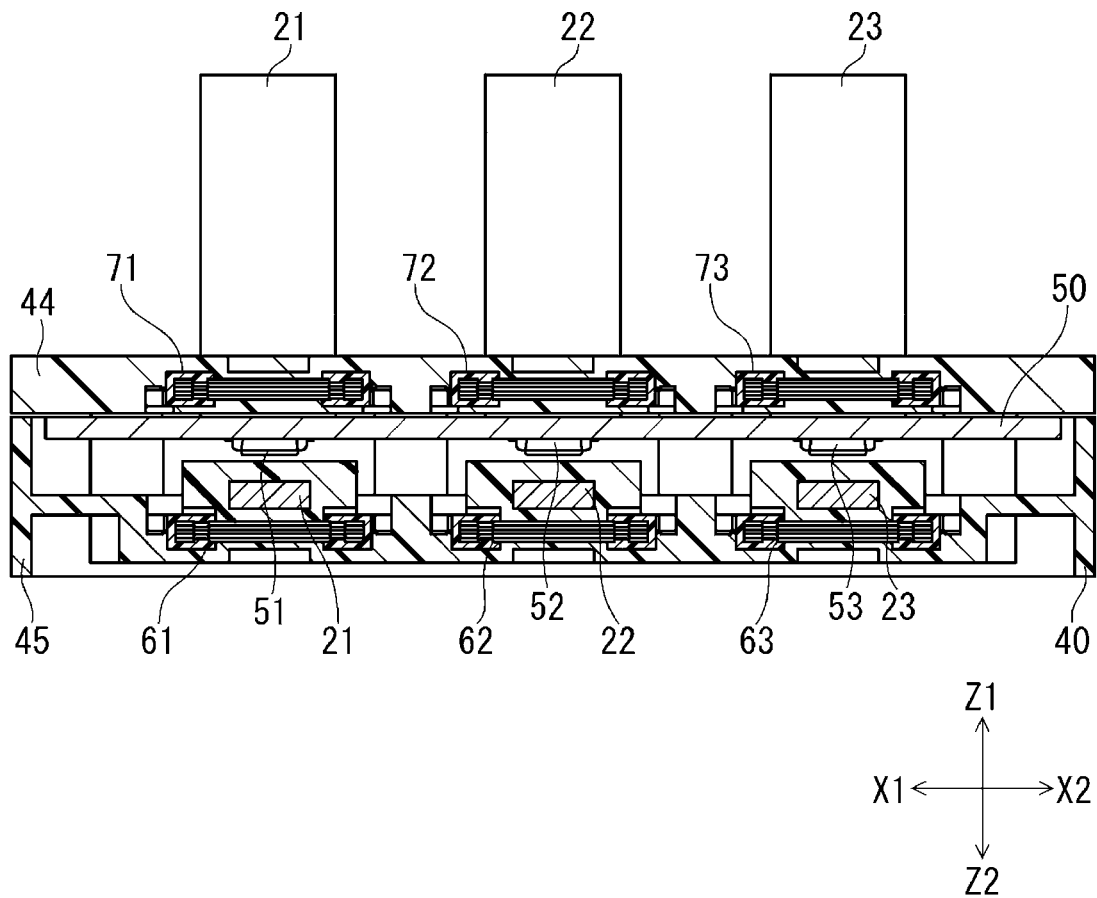
FIG. 2A is a sectional view along line IIA-IIA in FIG. 1A.
Figure 2B:
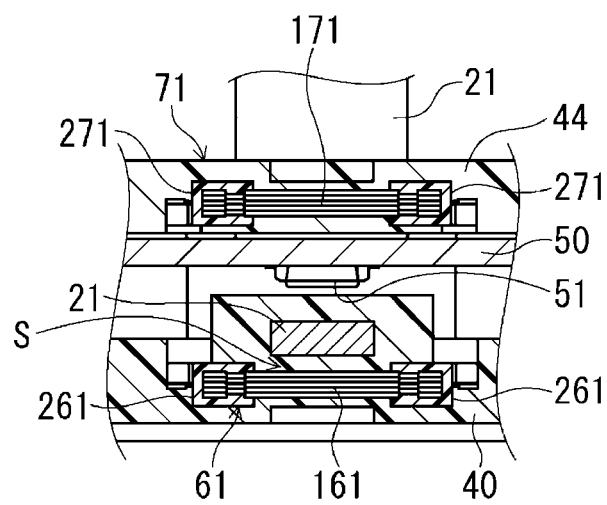
FIG. 2B is an enlarged view of part of FIG. 2A.
Figure 3:
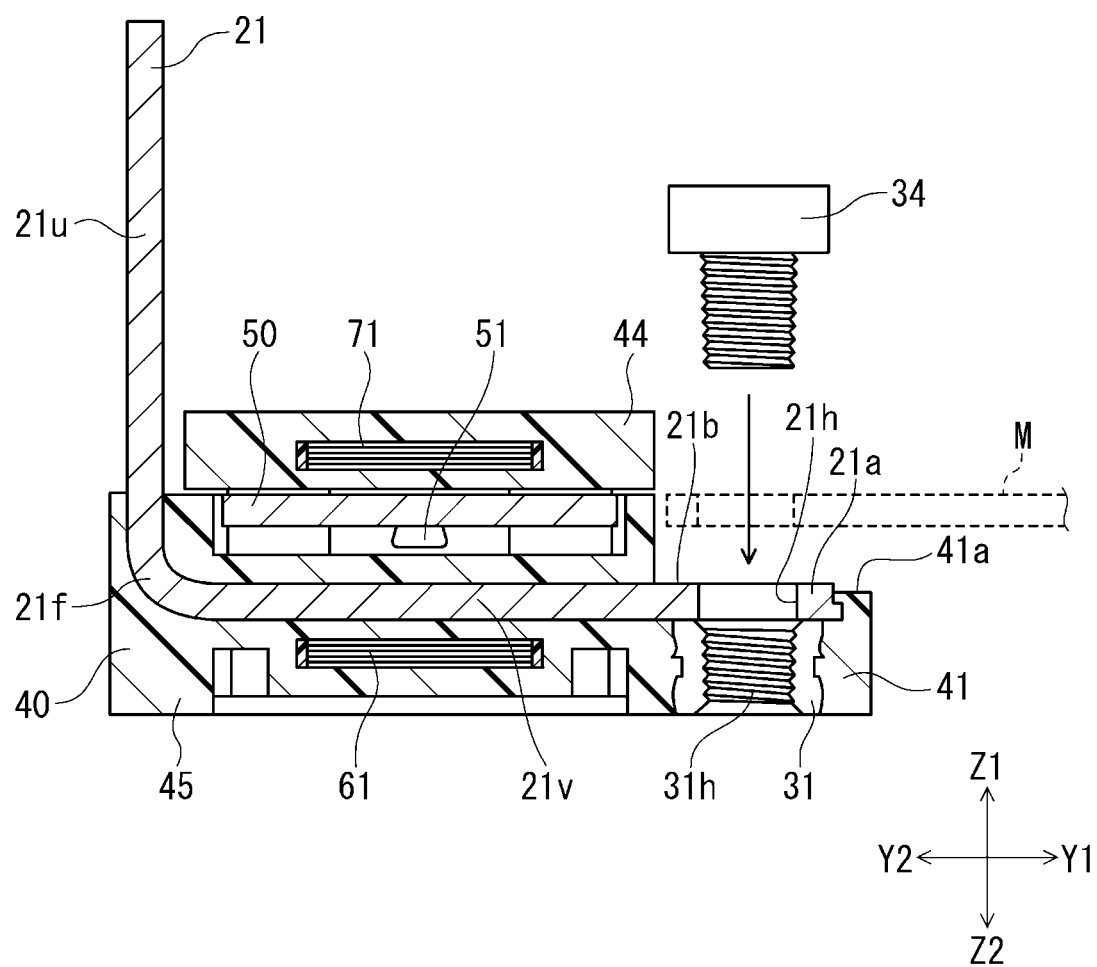
FIG. 3 is a sectional view along line III-III in FIG. 1A.
Figure 4A:
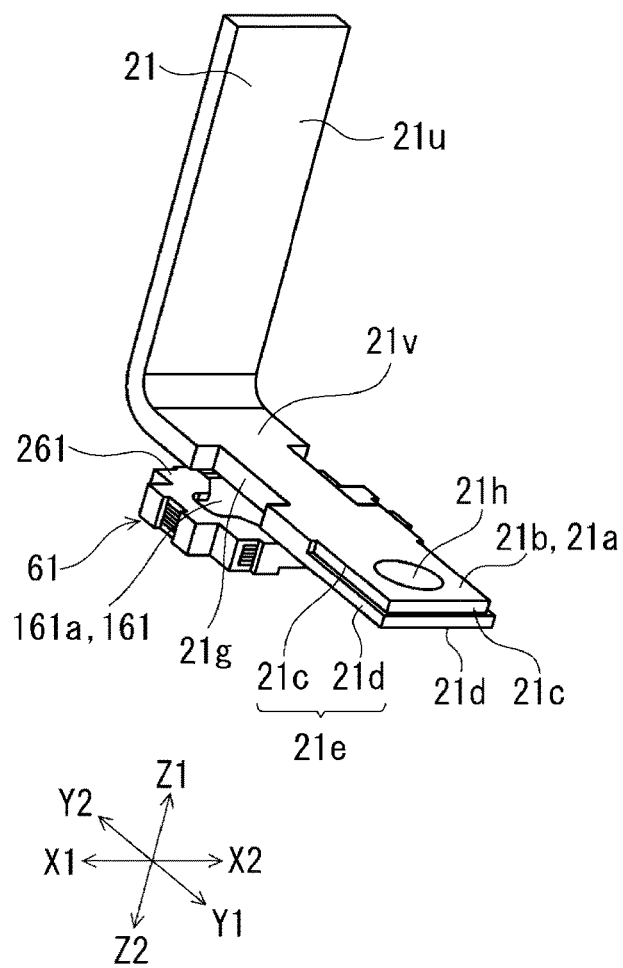
FIGS. 4A and 4B illustrate a relationship between a bus bar in the first embodiment and a first shield member corresponding to the bus bar.
Figure 4B:
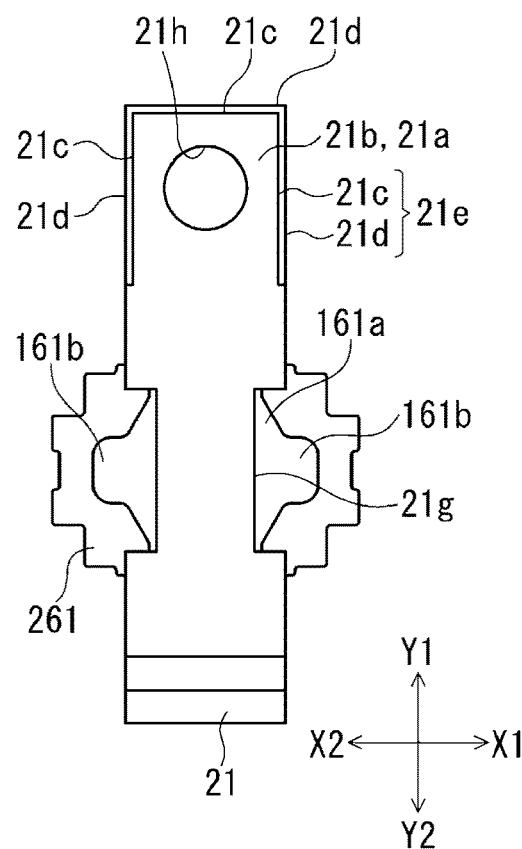

FIGS. 1A and 1B are each a perspective view illustrating the structure of a current detecting device 10 according to a first embodiment: the perspective view in FIG. 1A is viewed from the upper side (Z1 side), and the perspective view in FIG. 1B is viewed from the lower side (Z2) side. FIG. 2A is a sectional view along line IIA-IIA in FIG. 1A, and FIG. 2B is an enlarged view of part of FIG. 2A. FIG. 3 is a sectional view along line III-III in FIG. 1A. FIG. 3 also illustrates a bolt 34 used to electrically connect an external member M to a bus bar 21. FIGS. 4A and 4B each illustrate a relationship between the bus bar 21 in the first embodiment and a first shield member 61 corresponding to the bus bar 21: FIG. 4A is a perspective view and FIG. 4B is a plan view.

Figure 5A:
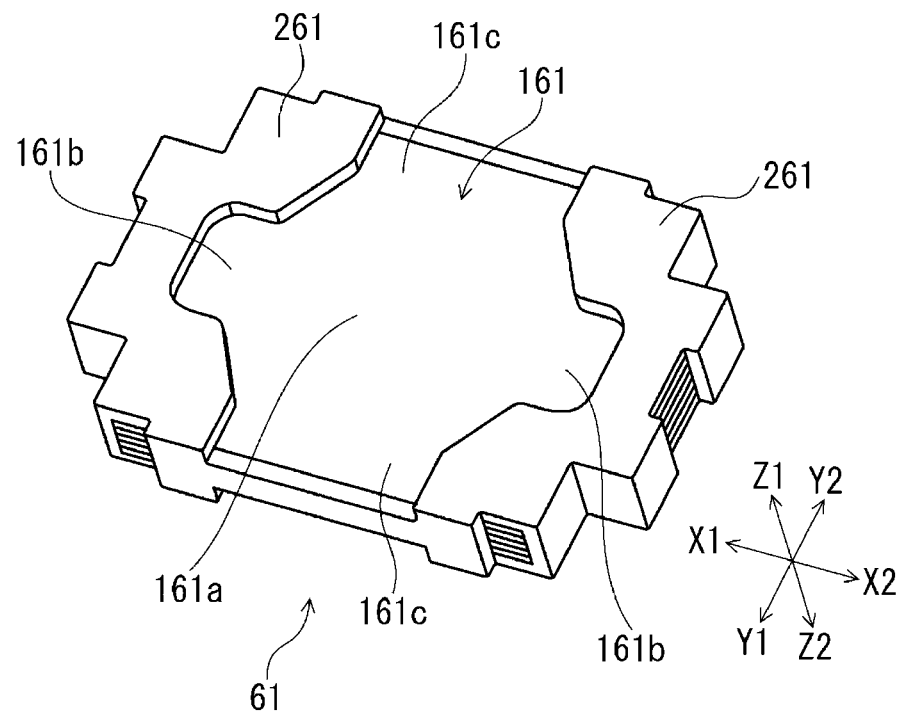
FIG. 5A is a perspective view illustrating the structure of the first shield member in the first embodiment.
Figure 5B:
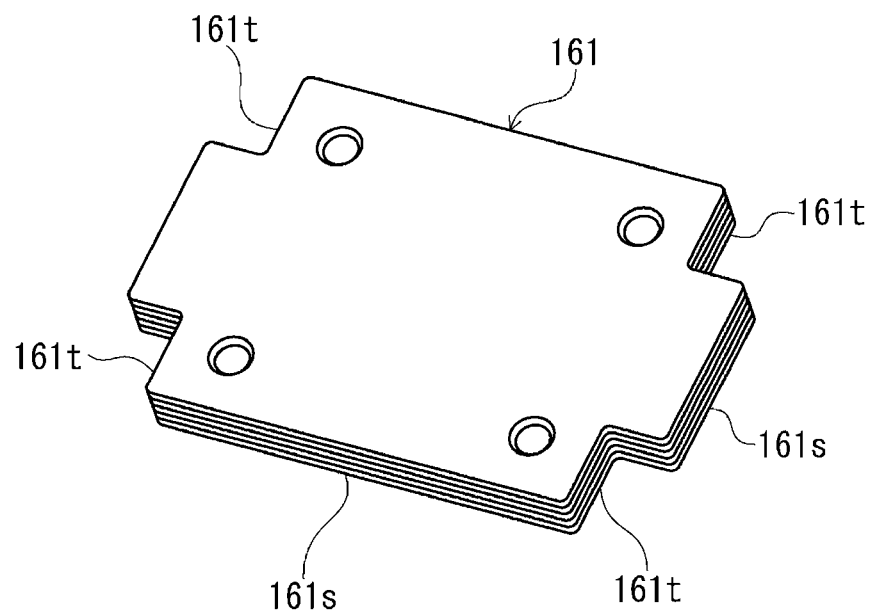
FIG. 5B is a perspective view illustrating the structure of a base material included in the first shield member in FIG. 5A.
Figure 6:
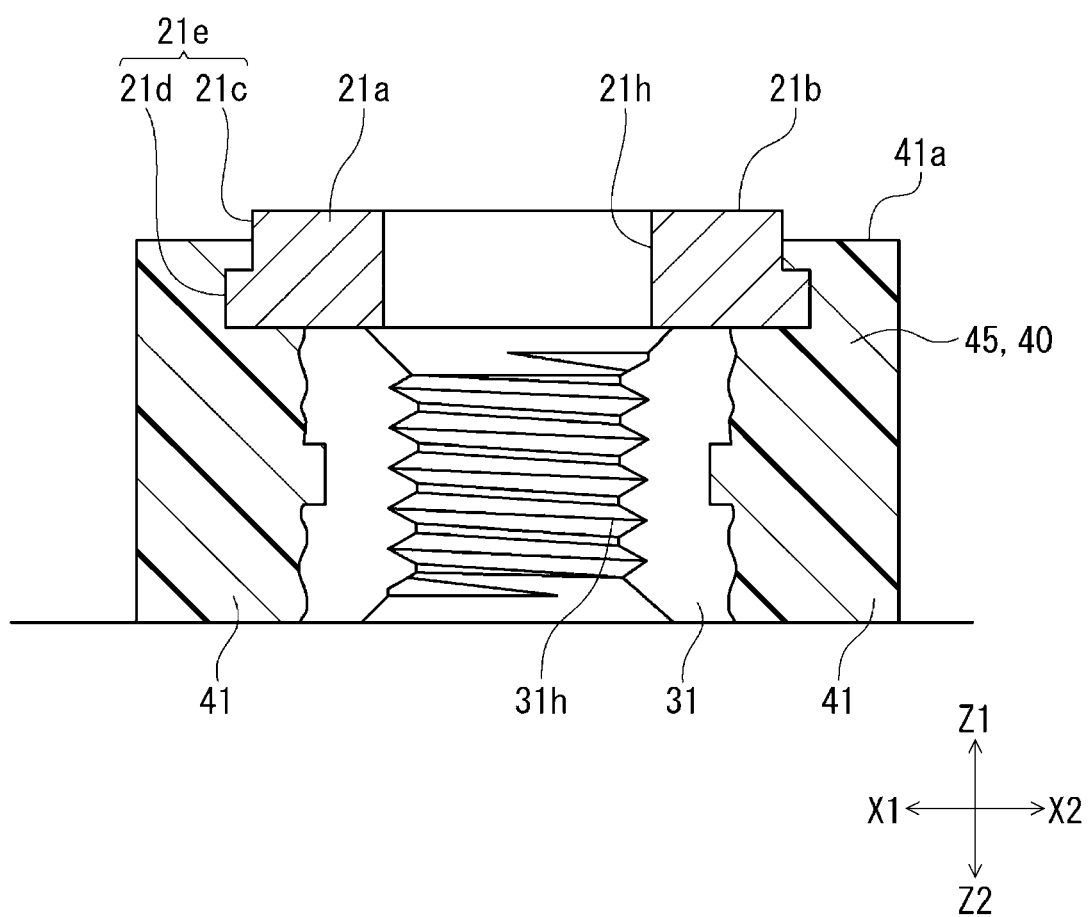
FIG. 6 is a sectional view along line VI-VI in FIG. 1A.

FIG. 5A is a perspective view illustrating the structure of the first shield member 61 in the first embodiment, and FIG. 5B is a perspective view illustrating the structure of a base material 161 included in the first shield member 61 in FIG. 5A. FIG. 6 is a sectional view along line VI-VI in FIG. 1A.

As illustrated in FIGS. 1A and 1B or FIG. 2A, the current detecting device 10 in the first embodiment has: bus bars 21, 22, and 23 through which a current under measurement flows; a chassis 40 that incorporates part of the bus bars 21, 22, and 23 and holds them; magnetic sensors 51, 52, and 53 respectively placed so as to face the plate surfaces of the bus bars 21, 22, and 23 in a plate shape; and three pairs of shield members (first shield members 61, 62, and 63 and second shield members 71, 72, and 73), which respectively interpose the bus bars 21, 22, and 23 and the magnetic sensors 51, 52 and 53. That is, a bus bar and a magnetic sensor are placed between a first shield member and a second shield member, which form a shield member pair. The bus bars 21, 22, and 23 are spaced at equal intervals in the left-right direction (X1-X2 direction). The magnetic sensors 51, 52 and 53, which respectively face the bus bars 21, 22, and 23, are also spaced at equal intervals. However, the bus bars 21, 22, and 23 may not be spaced at equal intervals in the left-right direction (X1-X2 direction).

The above shield members are classified into the first shield members 61, 62, and 63, which are respectively positioned close to the bus bars 21, 22, and 23, and the second shield members 71, 72, and 73, which are respectively positioned closer to the magnetic sensors 51, 52 and 53 than to the bus bars 21, 22, and 23. The first shield members 61, 62, and 63 are placed sequentially from the left side in FIG. 2A toward the right side (from the X1 side toward the X2 side), in the order of the first shield members 61, 62, and 63. Similarly, as with the first shield members, the second shield members 71, 72, and 73 are placed sequentially from the left side in FIG. 2A toward the right side (from the X1 side toward the X2 side), in the order of the second shield members 71, 72, and 73. The first shield member 61 and second shield member 71 form a first pair, and are placed so as to interpose the magnetic sensor 51 and bus bar 21 between them. Similarly, the first shield member 62 and second shield member 72 form a second pair, and are placed so as to interpose the magnetic sensor 52 and bus bar 22 between them. Similarly, the first shield member 63 and second shield member 73 form a third pair, and are placed so as to interpose the magnetic sensor 53 and bus bar 23 between them.

Two first shield members 61 and 71, which form the first pair, and the magnetic sensor 51 and bus bar 21 interposed between them constitute a first sensor portion. Similarly, two shield members 62 and 72, which form the second pair, and the magnetic sensor 52 and bus bar 22 interposed between them constitute a second sensor portion. Similarly, two shield members 63 and 73, which form the third pair, and the magnetic sensor 53 and bus bar 23 interposed between them constitute a third sensor portion.

The chassis 40 is formed by being molded from a nonmagnetic resin material having an insulation property. The chassis 40 preferably has a case 45 and a cover 44, which covers the top of the case 45. As illustrated in FIGS. 2A and 2B and FIG. 3, the second shield members 71, 72, and 73 are insert-molded into the cover 44 and are held, and the first shield members 61, 62, and 63 are preferably insert-molded into the case 45 and are held.

A substrate 50, on which the magnetic sensors 51, 52, and 53 are mounted so that the magnetic sensors 51, 52, and 53 respectively face the bus bars 21, 22, and 23, is preferably fixed to the case 45. Thus, magnetic fields generated when currents flow through the bus bars 21, 22, and 23, which respectively face the magnetic sensors 51, 52, and 53, can be respectively detected by the magnetic sensors 51, 52, and 53.

The bus bars 21, 22, and 23 have the same shape. Although in the description with reference to FIGS. 2B, FIG. 3, FIGS. 4A and 4B, and FIG. 6, the bus bar 21 will be taken as an example, the other bus bars 22 and 23 also have a similar structure. However, the bus bars 21, 22, and 23 may have mutually different shapes.

As illustrated in FIG. 3, the bus bar 21 has a structure obtained by bending a plate-like metal material in the thickness direction. In this structure, an erecting portion 21$u$ extends in the up-down direction (Z1-Z2 direction) from a bent portion 21$f$ formed by the bending, and an extending portion 21$v$ (overhang portion) extends along the front-back direction (Y1-Y2 direction).

A fastening terminal portion 21$a$ is provided at an end of the extending portion 21$v$ on the front side (Y1 side). In the fastening terminal portion 21$a$, a through-hole portion 21$h$, which extends through the bus bar 21 in the thickness direction (Z1-Z2 direction), is formed. The shape of the cross section of the through-hole portion 21$h$ is circular, the cross section being orthogonal to the axial direction of the through-hole portion 21$h$. The bent portion 21$f$ is formed between an end, of the bus bar 21, at which the fastening terminal portion 21$a$ is preferably provided and an opposite end in the longitudinal direction of the bus bar 21 (upper end of the erecting portion 21$u$).

The magnetic sensor 51 is preferably placed so as to face a position between the bent portion 21$f$ and fastening terminal portion 21$a$ of the bus bar 21. In this placement, even if a spring back effect occurs at the bent portion 21$f$, since the extending portion 21$v$ is held by being embedded in the chassis 40, the positional relationship between the bus bar 21 and the magnetic sensor 51 is maintained. Therefore, detection precision is assured, and the electrical connection between the fastening terminal portion 21$a$ and a fastening member 31 is stably maintained.

The extending portion 21$v$ has a narrow portion 21$g$ with a small width in the left-right direction at a position at which the narrow portion 21$g$ faces the first shield member 61 when the bus bar 21 is fixed to the case 45.

As illustrated in FIG. 1A, the other bus bars 22 and 23 also respectively have fastening terminal portions 22$a$ and 23$a$ as well as through-hole portions 22$h$ and 23$h$, similarly as with the through-hole portion 21$h$ above. As for the through-hole portions 22$h$ and 23$h$ as well, their cross sections orthogonal to the axial directions of the through-hole portions 22$h$ and 23$h$ are circular.

As illustrated in FIGS. 1A and 1$i$, the case 45 includes three protruding portions 41, 42, and 43 extending in a plate shape in the forward direction. The protruding portions 41, 42, and 43 are spaced at equal intervals so as to correspond to the bus bars 21, 22, and 23 in the left-right direction. The fastening terminal portions 21$a$, 22$a$, and 23$a$ of the bus bars 21, 22, and 23 are respectively fixed to the tops of the protruding portions 41, 42, and 43. The protruding portions 41, 42, and 43 respectively have fastening members 31, 32, and 33, which are respectively used to fasten the bolt 34 to the bus bars 21, 22, and 23, the bolt 34 being used to electrically connect the external member M to the bus bar 21, 22, or 23, whichever is appropriate (see FIG. 3).

As illustrated in FIG. 3, the fastening member 31 is a nut provided in the protruding portion 41. The fastening member 31 has an inner surface 31$h$, in which threads are formed in correspondence to the bolt 34. The fastening member 31 is formed so as to pass through the protruding portion 41 in the up-down direction and so that the central axis is aligned with the up-down direction. Furthermore, the fastening member 31 is disposed so that there is a match in an X-Y plane between the central axis of the inner surface 31$h$ and the central axis of the through-hole portion 21$h$ in the fastening terminal portion 21$a$ of the bus bar 21 fixed to the protruding portion 41. Thus, the through-hole portion 21$h$ and inner surface 31$h$ communicate with each other, forming a hole portion extending in the up-down direction. When the bolt 34 is inserted from the through-hole portion 21$h$ and is screwed into the inner surface 31$h$ until the bolt 34 comes into contact with a connection surface 21$b$ (fastening surface), which is a surface of the fastening terminal portion 21$a$, the fastening member 31 and the fastening terminal portion 21$a$ of the bus bar 21 are fastened together so that they come into contact with each other.

As illustrated in FIGS. 4A and 4B, an anchor portion 21$e$ is formed at the fastening terminal portion 21$a$ of the bus bar 21. On the front end face and two side end faces of the anchor portion 21$e$, steps are formed between the upper surface side and the lower surface side, within a range corresponding to the fastening member 31 in plan view. Specifically, on the front end face, an upper portion 21$c$ is formed by shifting the upper surface side in the backward direction with respect to a lower portion 21$d$ on the lower surface side; and on the side end faces, the other upper portion 21$c$ is formed by shifting the upper surface side toward the inner side in the left-right direction with respect to the lower portion 21$d$ having the same width in the left-right direction as other portions of the extending portion 21$v$. By, for example, stamping the end of the upper surface, a surface that is one step lower than the upper surface is formed. Therefore, the upper portion 21$c$ is more inside and has a smaller area than the lower portion 21$d$ in plan view.

The surface of the upper portion 21$c$ is flush with the connection surface 21$b$ of the fastening terminal portion 21$a$. The surface of the lower portion 21$d$ is shifted in the up-down direction with respect to the connection surface 21$b$.

As illustrated in FIG. 6, the fastening terminal portion 21$a$ is embedded in the case 45 of the chassis 40 in a state in which the connection surface 21$b$ protrudes upward beyond the surface 41$a$ of the chassis 40. The upper surface of the step (lower portion 21$d$) of the anchor portion 21$e$ is embedded in the case 45 of the chassis 40. In other words, as for the anchor portion 21$e$, the whole of the bus bar 21 and part of the upper portion 21$c$ are covered with the case 45, and the upper portion of the upper portion 21$c$ is exposed in a state in which the upper portion of the upper portion 21$c$ protrudes upward from the surface 41$a$ of the case 45. The bus bar 21 is formed integrally with the chassis 40, which is a molded body formed from a resin material by being insert-molded. Therefore, a structure that covers the anchor portion 21$e$ can be easily formed, and resin burrs can be avoided because steps are formed along the boundary between the connection surface 21$b$ and the surface 41$a$ of the chassis 40. This reliably achieves an electrical connection to an external part. Since a structure is used in which the whole of the lower portion 21$d$ of the anchor portion 21$e$ is embedded in the chassis 40, even if a spring back effect is generated in the bus bar 21, it is possible to prevent the bus bar 21 from lifting with respect to the fastening member 31. When a lift is prevented, it is possible to suppress variations in the position of the bus bar 21 with respect to the magnetic sensor 51, so stable measurement precision can be obtained. In contrast to this, if the connection surface 21$b$ and the surface 41*a* of the chassis 40 form a continuous plane, the resin material of the chassis 40 may seep to a portion of the connection surface 21*b* due to variations in molding conditions and a resin burr that covers the surface may thereby be generated. Since the resin material has an insulation property, if a resin burr is generated, when an external part and the bus bar 21 are connected together, an electrical continuity cannot be taken.

Even when the size of the current detecting device 10 is made small and the size of the bus bar 21 and the interval between the bus bar 21 and the adjacent bus bar 22 are thereby made small, since the anchor portion 21*e* is placed and fixed as described above, the fastening terminal portion 21*a* of the bus bar 21 is reliably held in the chassis 40. Therefore, the fastening terminal portion 21*a* becomes less likely to be deformed, the positional relationship between the fastening terminal portion 21*a* and the fastening member 31 is maintained, and the position of the bus bar 21 is not changed with respect to the magnetic sensor 51. This makes it possible to perform high-precision detection.

As illustrated in FIG. 1A, the cover 44 preferably has hole portions 44*a* that extend through it in the thickness direction (up-down direction). Specifically, four hole portions 44*a* are preferably arranged front-back and left-right symmetrically for each of the second shield members 71, 72, and 73 disposed in the cover 44 so that part of an extended portion (described later) of each of the second shield members 71, 72, and 73 is exposed in plan view.

As illustrated in FIG. 1B, the case 45 has hole portions 45*a* that extend through it in the thickness direction (up-down direction). Specifically, for each of the first shield members 61, 62, and 63 disposed in the case 45, four hole portions 45*a* are arranged front-back and left-right symmetrically so that part of an extended portion of each of the first shield members 61, 62, and 63, the extended portion being, for example, part of an extended portion 161*c* of the first shield member 61, is exposed in a state in which the hole portions 45*a* are viewed from the lower side (Z2 side). However, for each of the first shield members 61, 62, and 63, the number of hole portions 45*a* and their placement may differ from the structure described above.

The hole portion 44*a* in the cover 44 is formed as a result of removing the positioning pin used to position the second shield member 71, 72, or 73, whichever is appropriate, during insert molding. The hole portion 45*a* in the case 45 is formed as a result of removing the positioning pin used to position the first shield member 61, 62, or 63, whichever is appropriate. When molding in which positioning pins are used as described above is performed, it becomes possible to enhance placement precision for the first shield members 61, 62, and 63 and second shield members 71, 72, and 73 in the mold. Therefore, measurement precision for current can be enhanced.

The first shield members 61, 62, and 63 and second shield members 71, 72, and 73 have the same shape. Although in the description with reference to FIGS. 5A and 5B, the first shield member 61 will be taken as an example, the other first shield members 62 and 63 and the second shield members 71, 72, and 73 also have a similar structure.

As illustrated in FIG. 5A, the first shield member 61 has a base material 161 and a protecting portion 261. As illustrated in FIG. 2B, the second shield member 71 has a base material 171 and a protecting portion 271, as with the first shield member 61.

As illustrated in FIG. 5B, the base material 161 has as structure in which a plurality of metal plate-like bodies having the same shape are laminated. The four corners, which are rectangular in plan view, are cut out in a rectangular shape to form cutout portions 161*t*. As illustrated in FIG. 5A, the protecting portion 261, which is formed from a resin material, is preferably placed so as to cover the end faces of the cutout portions 161*t*, which are part of the end faces 161*s* of the base material 161, and end faces in the vicinity of the cutout portions 161*t*. The protecting portion 261 also covers part of the upper surface and bottom surface continuous to the end faces 161*s* of the base material 161, so the thickness of the protecting portion 261 in the up-down direction is greater than the thickness of the base material 161. Since the base material 161 has a rectangular shape in plan view, its dimensions are easily managed and measurement precision for current can be enhanced. Since the corners of the base material 161 are cut out in a rectangular shape, a cutout process is easily managed and point contacts with the positioning pins can be easily achieved. Therefore, high-precision positioning can be achieved with end face exposure suppressed.

As illustrated in FIG. 5A, the central portion of the base material 161 in the X1-X2 direction is not preferably covered with the protecting portion 261 in plan view, but is preferably formed as an exposed portion 161*a*. As illustrated in FIGS. 4A and 4B, at the first shield member 61, the exposed portion 161*a* preferably faces the extending portion 21*v* of the bus bar 21.

As illustrated in FIGS. 4B and 5A, wide-width portions 161*b* extending in the left-right direction (X1-X2 direction) continue to a portion substantially at the center of the exposed portion 161*a* in the front-back direction. This wide-width portion 161*b* is formed so that the base material 161 has a wider width than the opposing bus bar 21 in the left-right direction and is exposed in plan view without being covered with the bus bar 21. That is, when the exposed portion 161*a* is viewed from the same side as the bus bar 21, the wide-width portion 161*b* is preferably formed so as to expose the base material 161 on the outside of a portion at which the exposed portion 161*a* overlaps the bus bar 21.

As illustrated in FIGS. 4B and 5A, extended portions 161*c* extending in the front-back direction (Y1-Y2 direction) preferably continue to a portion substantially at the center of the exposed portion 161*a* in the left-right direction. These extended portions 161*c* face the bus bar 21.

As for the first shield member 61, the cutout portion 161*t*, which is part of the end face 161*s* of the base material 161, is covered with the protecting portion 261. Therefore, even if the first shield member 61 is exposed to the inner surface of a hole formed at a portion at which a support pin was present in the chassis 40 after molding, the support pin being abutted to a position at which the protecting portion 261 is present to restrict the position of the first shield member 61 during the integral molding (insert molding) of the first shield member 61 with the chassis 40, the base material 161 is not exposed. Therefore, an event is less likely to occur in which the base material 161 is exposed and then corroded and the operation of the current detecting device 10 is thereby adversely affected. When the protecting portion 261 is formed around the base material 161 by injection molding, the end faces (fracture surfaces) of the base material 161 are exposed from the protecting portion 261 at portions at which the support pins were abutted to hold the base material 161 at a predetermined position in the molding. However, since the first shield member 61 is insert-molded to the chassis 40, the portions at which the end faces (fracture surfaces) of the base material 161 are exposed are covered with the resin material of the chassis 40. Therefore, an event is less likely to occur in which the exposed base material 161 is corroded and the operation of the current detecting device 10 is thereby adversely affected.

Since the exposed portion 161a thinner than the protecting portion 261 is placed at a position at which the exposed portion 161a faces the bus bar 21, a gap S (see FIG. 2B) between the first shield member 61 and the bus bar 21 can be widened. This allows the resin material used for insert-molding to easily flow into this gap S, so the resin material can be evenly and appropriately placed to a predetermined thickness. Therefore, the current detection function can be stabilized. Furthermore, since the first shield member 61 has the wide-width portions 161b, which are not covered with the bus bar 21, and the extended portions 161c extending to the ends of the base material 161 in the front-back direction, the resin material can be more stably supplied to the gap S between the first shield member 61 and the bus bar 21.

Variations of the first embodiment will be described below.

Figure 7A:
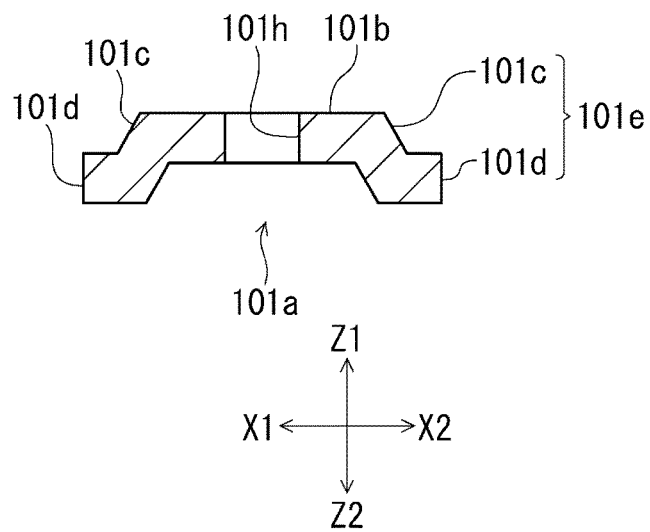
FIGS. 7A, 7B, 7C, 7D, and 7E each illustrate a fastening terminal portion and the structures of an anchor portion in a variation of the first embodiment.
Figure 7B:
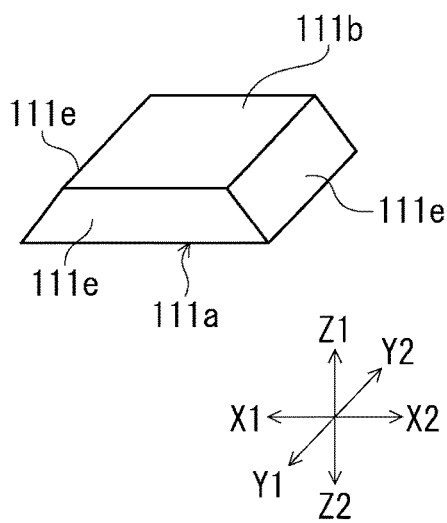
Figure 7C:
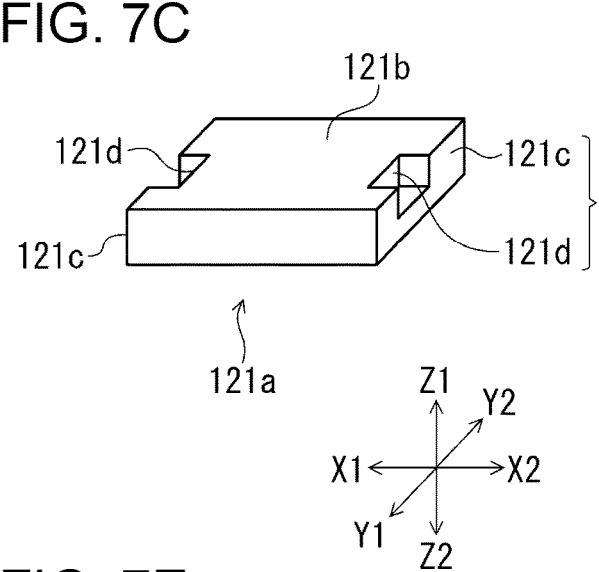
Figure 7D:
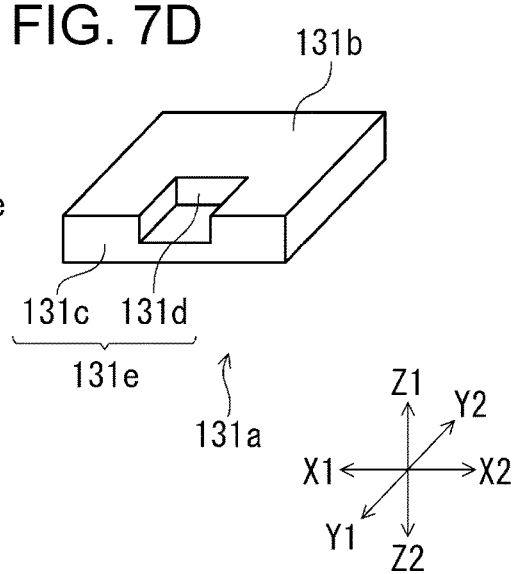
Figure 7E:
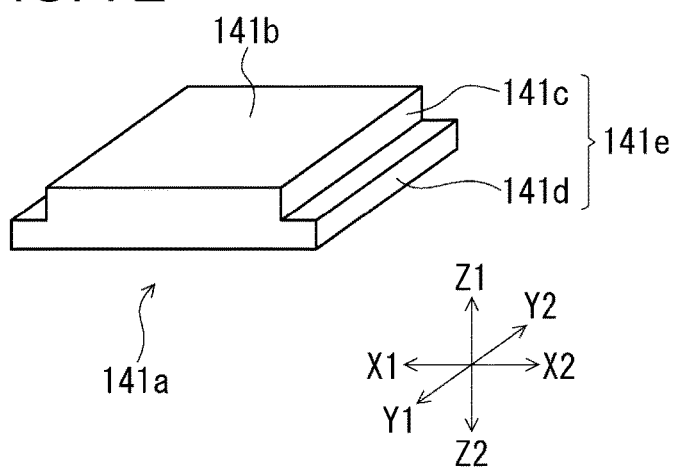

FIGS. 7A, 7B, 7C, 7D, and 7E respectively illustrates the structures of fastening terminal portions 101a, 11a, 121a, 131a, and 141a as well as the structures of anchor portions 101e, 11e, 121e, 131e, and 141e in variations of the first embodiment. FIG. 7A is a sectional view illustrating the fastening terminal portion 101a and anchor portion 101e in variation 1. FIG. 7B is a perspective view illustrating the fastening terminal portion 111a and anchor portion 111e in variation 2. FIG. 7C is a perspective view illustrating the fastening terminal portion 121a and anchor portion 121e in variation 3. FIG. 7D is a perspective view illustrating the fastening terminal portion 131a and anchor portion 131e in variation 4. FIG. 7E is a perspective view illustrating the fastening terminal portion 141a and anchor portion 141e in variation 5. The sectional view in FIG. 7A is orthogonal to the front-back direction (Y1-Y2 direction). In FIGS. 7B to 7E, through-holes extending through the bus bar in the thickness direction are not illustrated.

As for the anchor portion 21e in the first embodiment above, the surfaces of the upper portion 21c and lower portion 21d extend in the direction of an X-Y plane and the side face of the upper portion 21c extends along the up-down direction, as illustrated in FIGS. 4A and 4B and FIG. 6.

In contrast to this, as for the fastening terminal portion 101a illustrated in FIG. 7A, a through-hole 101h extending through the bus bar in the thickness direction (up-down direction) is formed, the anchor portion 101e is constituted by an upper portion 101c and a lower portion 101d, and the side face of the upper portion 101c has a tapered shape that more extends outward as the side face is closer to the same side as the lower portion 101d. This anchor portion 101e is embedded in the case 45 of the chassis 40 in a state in which a connection surface 101b, which is the surface of the upper portion 101c, protrudes upward beyond the surface 41a of the chassis 40, as with the anchor portion 21e in the first embodiment. Therefore, effects similar to those in the first embodiment can be obtained.

As for the fastening terminal portion 111a illustrated in FIG. 7B, a connection surface 111b, which is the surface of the bus bar, forms a quadrangular shape in plan view, and an anchor portion 111e, which is constituted by side faces extending from the front edge and left and right edges of the four edges of the connection surface 111b, has tapered surfaces that more extend outward as they are closer to the lower side. This anchor portion 111e is embedded in the case 45 of the chassis 40 in a state in which the lower range is embedded in the chassis 40 and the connection surface 111b protrudes upward beyond the surface 41a of the chassis 40.

As for the fastening terminal portion 121a illustrated in FIG. 7C, a connection surface 121b, which is the surface of the bus bar, forms a substantially quadrangular shape in plan view. Part of the tops of side faces 121c continuous to the left and right edges is formed as concave portions 121d by crushing. The concave portions 121d and two side faces 121c, in which the concave portions 121d are formed, constitute the anchor portion 121e. This anchor portion 121e is embedded in the case 45 of the chassis 40 in a state in which the lower area of the side face 121c, the area including part of the lower side of the concave portion 121d, is embedded in the chassis 40 and the connection surface 121b protrudes upward beyond the surface 41a of the chassis 40.

As for the fastening terminal portion 131a illustrated in FIG. 7D, a connection surface 131b, which is the surface of the bus bar, forms a substantially quadrangular shape in plan view. Part of the top of a side face 131c continuous to the front edge is formed as a concave portion 131d by crushing. The concave portion 131d and the side face 131c, in which the concave portion 131d is formed, constitute the anchor portion 131e. This anchor portion 131e is embedded in the case 45 of the chassis 40 in a state in which the lower area of the side face 131c, the area including part of the lower side of the concave portion 131d, is embedded in the chassis 40 and the connection surface 121b protrudes upward beyond the surface 41a of the chassis 40.

As for the fastening terminal portion 141a illustrated in FIG. 7E, on two side-directional end faces, steps are formed between the upper surface side and lower surface side, as on the side-directional end faces of the fastening terminal portion 21a in the first embodiment. An upper portion 141c is formed by shifting the upper surface side toward the inner side in the left-right direction with respect to a lower portion 141d. The upper portion 141c and lower portion 141d constitute the anchor portion 141e. This anchor portion 141e is embedded in the case 45 of the chassis 40 in a state in which a connection surface 141b, which is the surface of the upper portion 141c, protrudes upward beyond the surface 41a of the chassis 40.

In the first embodiment, the planar shape of the base material 161 has been rectangular in plan view. However, the base material 161 can also take a polygonal shape other than rectangular shapes as the planar shape. In this structure as well, when cutout portions are formed at the corners and positioning pins are brought into point contact with the end faces of the cutout portions, insert-molding can be performed in a state in which the shield members are precisely placed.

In the first embodiment, cutout portions 161t have been formed at the four corners of the base material 161, that is, at two pairs of diagonal positions. Instead of this, however, cutout portions may be formed at only one pair of diagonal positions or at three corners. When a polygonal shape other than rectangular shapes is taken as the planar shape of the base material 161, if the base material 161 can be accurately positioned, the number of cutout portions may be any number greater than or equal to 2.

Second Embodiment

Figure 8A:
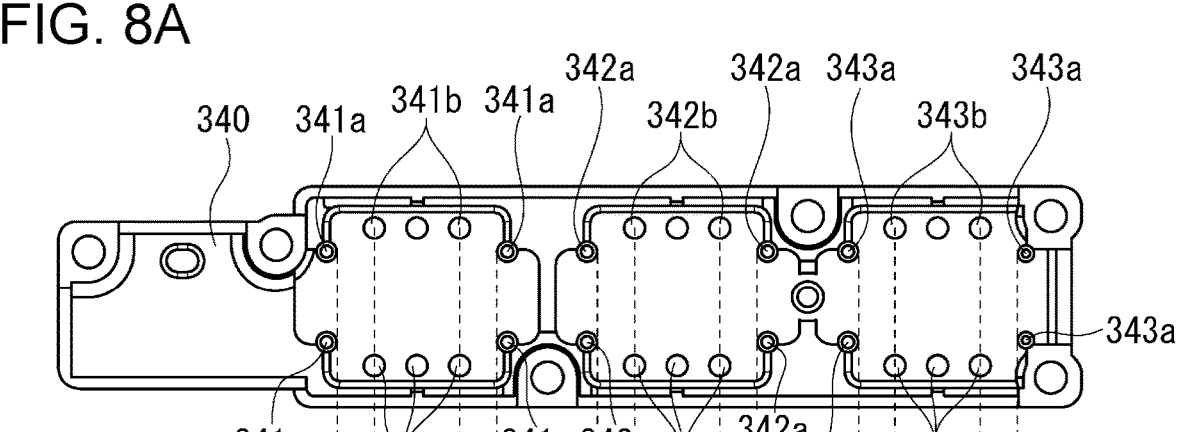
FIG. 8A is a bottom view illustrating the structure of a case in a second embodiment.
Figure 8B:
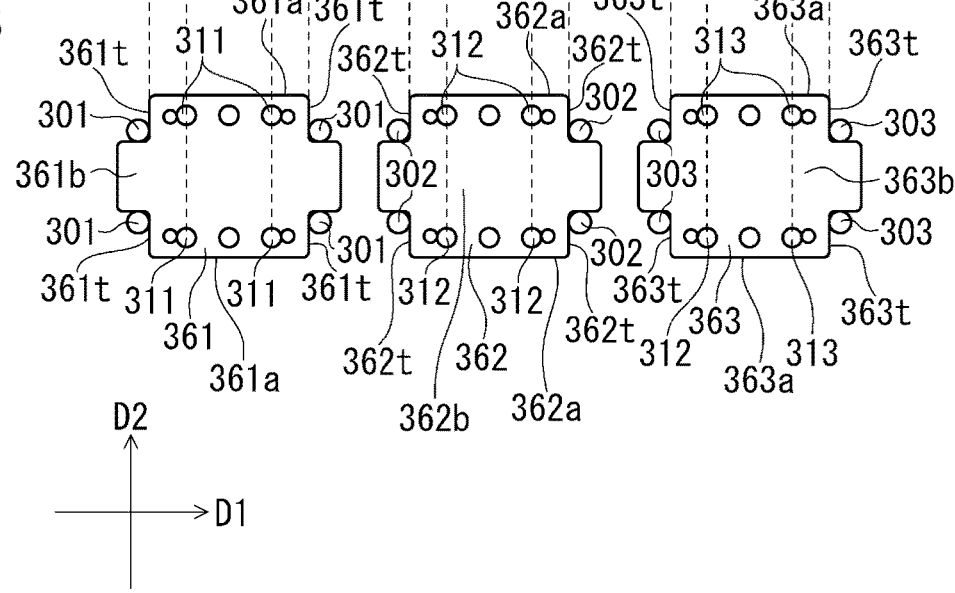
FIG. 8B is a bottom view illustrating the structures of shield members incorporated in the case in FIG. 8A.
Figure 9:
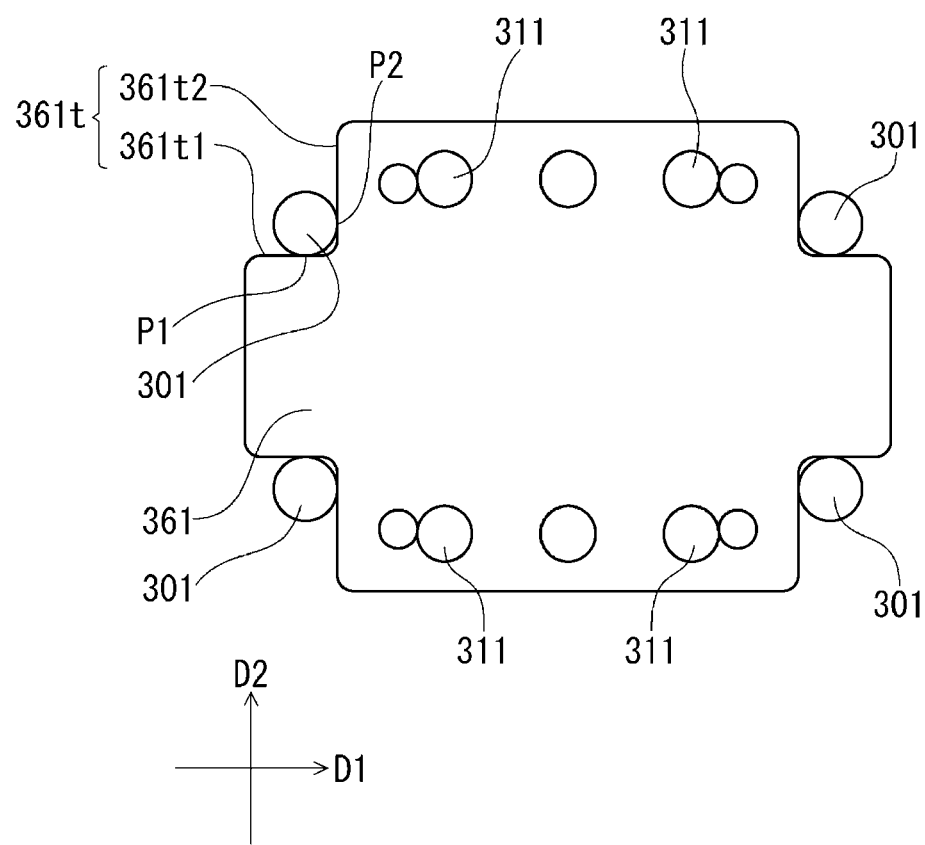
FIG. 9 is an enlarged bottom view of the shield member on the left side in FIG. 8B.
Figure 10:
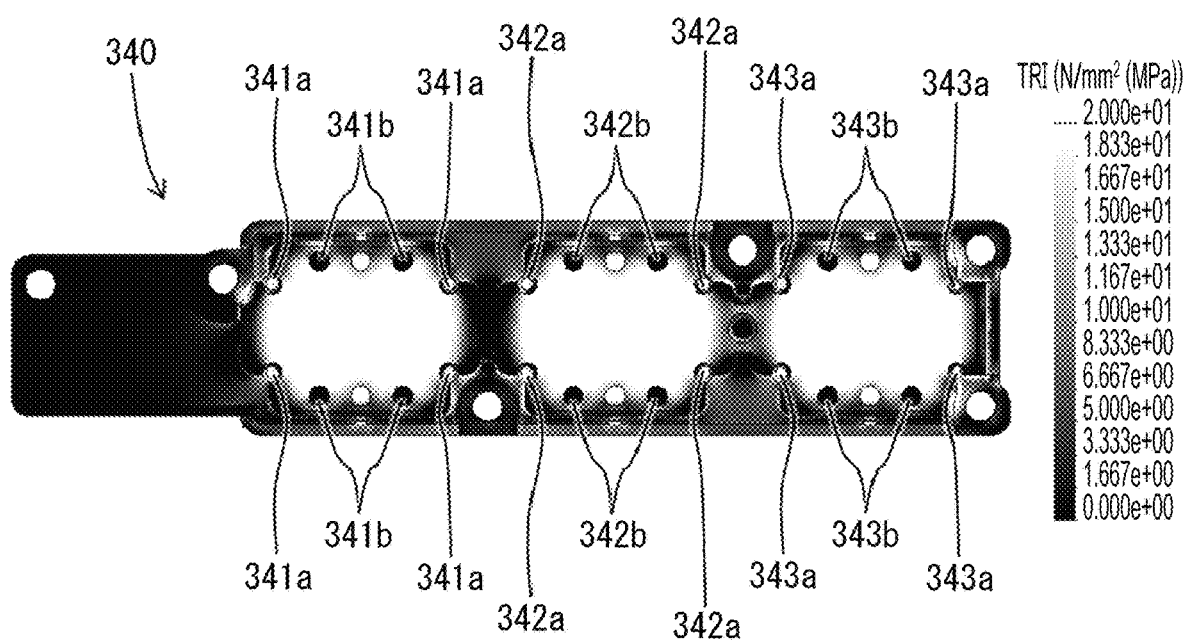
FIG. 10 illustrates a thermal stress distribution of the case illustrated in FIG. 8A.

FIG. 8A is a bottom view illustrating the structure of a case 340 in a second embodiment, and FIG. 8B is a bottom view illustrating the structures of the base materials 361, 362, and 363 of shield members incorporated in the case 340 in FIG. 8A. FIG. 9 is an enlarged bottom view of the base material 361 of the shield member in FIG. 8B. FIG. 10 illustrates thermal stress distribution of the case 340 illustrated in FIG. 8A. In FIGS. 8B and 9, support pins 301, 302, and 303 used for horizontal positioning and positioning pins 311, 312, and 313 used for vertical positioning are illustrated together.

The case 340 illustrated in FIG. 8A, which is used as a chassis, has a structure in which the base materials 361, 362, and 363 of the shield members are incorporated by being insert-molded, as with the case 45 (chassis 40) in the first embodiment. Therefore, the structure, manufacturing process, effects, and the like of the case 340 can also be applied to the case 45 and cover 44 in the first embodiment. Therefore, a structure can be taken in which three sensor portions are arranged in a row along a first direction D1, which is the longitudinal direction of the case 340, by using three pairs of shield members, each pair being placed at positions at which the pair incorporates a bus bar and magnetic sensor in the lamination direction, that is, by using the shield members in the cover 44 and the shield members in the case 45, as in the first embodiment. When the case 340 is structured like this, the extending direction of the bus bar is as in the first embodiment; the extending direction is orthogonal to the first direction D1. Even when the number of sensor portions is 2 or 4 or more, the structure, actions, and effects in the second embodiment can be obtained.

The base materials 361, 362, and 363 of the shield members illustrated in FIG. 8B each have a structure in which a plurality of metal plate-like bodies having the same shape are laminated and cutout portions 361t are formed by cutting out the four corners, each of which is quadrangular in plan view, in a rectangular shape, as with the base material 161, illustrated in FIG. 5B, in the first embodiment. Therefore, the cutout portion 361t preferably has an end face 361t1 extending along the first direction D1 and an end face 361t2 extending along a second direction D2 (width direction of the case 340) orthogonal to the first direction D1 (see FIG. 9).

In insert-molding of the base materials 361, 362, and 363 of the shield members in the case 340, the support pins 301, 302, and 303 in a columnar shape are used for positioning in an in-plane direction of a plane including the first direction D1 and second direction D2 (the in-plane direction is the direction of the drawing sheets in FIGS. 8A and 8B and is the horizontal direction when the bottom surface of the case 340 is horizontally placed). Specifically, as for the base material 361 of the shield member on the left side in FIG. 8B, each of the four support pins 301 abuts two end faces 361t1 and 361t2 of one of the four cutout portions 361t. The end face 361t1 of the cutout portion 361t extends in the first direction D1, and the end face 361t2 of the cutout portion 361t extends in the second direction D2. In plan view, therefore, the support pin 301 in a columnar shape is brought into point contact at a point P1 on one end face 361t1 and a point P2 on the other end face 361t2. These point contacts are also the same on a cross section along a plane parallel to the plate surface of the base material 361. At any position in the lamination direction, therefore, point contacts occur at the same positions on the cross section. In the thickness direction, orthogonal to the first direction D1 and second direction D2, of the base material 361 of the shield member, the support pin 301 is brought into line contact with a line that extends from the point P1 in the up-down direction (thickness direction) along the end face 361t1 of the cutout portion 361t and a line that extends from the point P2 in the up-down direction along the end face 361t2 of the cutout portion 361t. As for the base material 362 at the center and the base material 363 on the right side as well, four support pints 302 and four support pins 303 are respectively placed, and are respectively brought into point contact with the two end faces of the cutout portions 362t and 363t and into line contact in the thickness directions of the base materials 362 and 363, in plan view.

In insert-molding of the case 340 illustrated in FIG. 8A, a molding material composed of a resin material is supplied from the left side on the drawing sheet toward the right side along the first direction D1.

As illustrated in FIG. 8A, the case 340 has through-hole portions 341a, 342a, and 343a, in a hollow cylindrical shape, extending to the bottom surface at positions at which the support pins 301, 302, and 303 for insert-molding were placed. The shapes of the cross sections of the through-hole portions 341a, 342a, and 343a are preferably circular, the cross sections being respectively orthogonal to the axial directions of the through-hole 341a, 342a, and 343a.

At positions corresponding to the support pins 301, 302, and 303, the through-hole portions 341a, 342a, and 343a are formed in shapes having outlines corresponding to the support pins 301, 302, and 303. Therefore, on cross sections when the base materials 361, 362, and 363 are cut along a plane parallel to the plate surfaces of the base materials 361, 362, and 363 of the shield members, the above outline is preferably brought into point contact with two end faces at each of the cutout portions 361t, 362t, and 363t of the base materials 361, 362, and 363, respectively, and into line contact in the thickness directions of the base materials 361, 362, and 363, as with the support pins 301, 302, and 303. Therefore, it is possible to reduce contact areas formed during insert-molding between the base materials 361, 362, and 363 of the shield members and the support pins 301, 302, and 303 during insert-molding. Therefore, even if the end faces of the base materials 361, 362, and 363 made of a metal are exposed to the inner surfaces of the through-hole portions 341a, 342a, and 343a, the exposed areas of the cutout portions 361t, 362t, and 363t of the base materials 361, 362, and 363 can be made small. Therefore, an event is less likely to occur in which the end faces of the cutout portions 361t, 362t, and 363t are corroded and the operation of the current detecting device 10 is thereby adversely affected. If machining is performed in a state in which injection pressure under which a resin material is filled in a mold during insert-molding is slightly high within an appropriate range, the resin material may enter gaps between the base materials 361, 362, and 363 and the support pins 301, 302, and 303 and places at which the base materials 361, 362, and 363 are intrinsically exposed linearly after molding may be covered with the resin material. If there is no problem attributable to this, the end faces of the cutout portions, 361t, 362t, and 363t are less likely to be corroded. Therefore, even if the places at which to cause exposure are covered with the rein material, there is no problem.

Because the four cutout portions, 361t, 362t, and 363t have been respectively formed at the base materials 361, 362, and 363, the base materials 361, 362, and 363 can be stably supported during insert-molding, so exposure of the end faces of the base materials 361, 362, and 363 can be lessened.

In the insert-molding of the shield members in the case 340, the positioning pins 311, 312, and 313 in a columnar shape are used for positioning in a direction perpendicular to the first direction D1 and second direction D2 (the position is perpendicular to the drawing sheets in FIGS. 8A and 8B and is the vertical direction when the bottom surface of the case 340 is placed along the horizontal direction).

As indicated in FIG. 8B, the base materials 361, 362, and 363 are preferably placed so that the longer sides 361a, 362*a*, and 363*a* of the respective rectangles in plan view are aligned to the first direction D1. As for the base material 361 on the left side, each two fastening members 311 in a columnar shape abut each of both edges of the surface 361*b* of the base material 361 in the second direction D2. The fastening members 311 are placed so as to be symmetric with respect to the first direction D1 and second direction D2. As for the base material 362 at the center and the base material 363 on the right side as well, four fastening members 312 and four positioning pin 313 are placed as with the fastening members 311 corresponding to the base material 361 on the left side. When positioning pins are placed like this, no positioning pin is present on the central line of a supply path at the center in the second direction D2 when a molding material is supplied along the first direction D1, so the flow of the molding material is not impeded nor is it divided. Therefore, the molding material is also likely to enter a gap between the shield member and the bus bar, that is, a gap similar to the gap S in FIG. 2B.

As illustrated in FIG. 8A, the case 340 has exposure hole portions 341*b*, 342*b*, and 343*b*, in a hollow cylindrical shape, extending to the bottom surface at positions at which the fastening members 311, 312, and 313 for insert-molding were placed so that surfaces 361*b*, 362*b*, and 363*b*, which are plate surfaces at the ends of the base materials 361, 362, and 363 in the lamination direction, are exposed. The shapes of the exposure hole portions 341*b*, 342*b*, and 343*b* are circular, the cross sections being respectively orthogonal to the axial directions of the exposure hole portion 341*b*, 342*b*, and 343*b*.

In FIG. 10, an area in which the strength of thermal stress is high is displayed in white. The density of white is lowered as the strength of thermal stress is lowered, and the density of the color gradually changes from gray to black. The area in which the strength of thermal stress is the lowest is displayed in black. As seen from FIG. 10, in areas corresponding to the base materials 361, 362, and 363 made of a metal, the strength of thermal stress is high and is displayed in white. In comparison, areas composed of only a resin material without the base materials 361, 362, and 363 being placed are displayed in black, indicating that the strength of thermal stress is low. At places at which the exposure hole portions 341*b*, 342*b*, and 343*b* are formed, these places being in the areas corresponding to the base materials 361, 362, and 363, black is displayed at a higher level around the through-hole than at the central portion, indicating that the strength of thermal stress in the places is low. Therefore, even if weld lines extending from the exposure hole portions 341*b*, 342*b*, and 343*b* toward the downstream in the flow direction of the molding material are formed, since the strength of thermal stress is low, cracks are less likely to be generated along the weld lines.

The thermal expansion coefficient differs between the base materials 361, 362, and 363 made of a metal and the case 340 (chassis) made of a resin material. Therefore, when heat is applied to the case 340, the base materials 361, 362, and 363 more greatly expand than the case 340. In the case 340, therefore, stress is less likely to be exerted on areas in which the base materials 361, 362, and 363 are not incorporated, that is, areas made of a molding resin material, stress is likely to be exerted. On the cross section, of the case 340, that is along the lamination direction of the base materials 361, 362, and 363 (thickness direction), there is a great effect of the difference in thermal expansion coefficient in the vicinity of the centers of the base materials 361, 362, and 363 because molded resin portions are laminated on the top and bottom of the base materials 361, 362, and 363. Therefore, large stress is exerted on the molded resin portions.

The peripheral areas of the ends of the base materials 361, 362, and 363, which are, for example, areas among the base materials 361, 362, and 363, in plan view are composed of only the molding material. In the peripheral areas, therefore, the effect of thermal expansion coefficient is mitigated. Therefore, stress exerted on the molded resin portions becomes smaller than on the central portions of the base materials 361, 362, and 363. Therefore, it is thought that even if weld lines are formed so as to extend from the exposure hole portions 341*b*, 342*b*, and 343*b* in the first direction D1, which is the supply direction of the molding material, the problem that cracks are generated along the weld lines due to thermal stress is less likely to occur.

Furthermore, since the base materials 361, 362, and 363 are not placed in the peripheral areas of the ends of the base materials 361, 362, and 363 in plan view, the resin material for molding easily flows into the peripheral areas when compared with areas in which the base materials 361, 362, and 363 are incorporated. Therefore, even when the fastening members 311, 312, 313 are placed at both ends of the base materials 361, 362, and 363 in the second direction D2, the resin material is sufficiently filled in the peripheries of the fastening members 311, 312, 313, weld lines are less likely to be generated.

A variation of the second embodiment will be described below.

In the second embodiment, the shapes of the base materials 361, 362, and 363 have been rectangular in plan view. However, the base materials 361, 362, and 363 can also take a polygonal shape other than rectangular shapes as the planar shape. In this structure as well, when cutout portions are formed at the corners and the through-hole portions 341*a*, 342*a*, and 343*a* are partially brought into contact with the end faces of the cutout portions, high-precision positioning can be made possible and exposure of the end faces can be suppressed to a small amount.

In the second embodiment, two exposure hole portions 341*b*, two exposure hole portions 342*b*, and two exposure hole portions 343*b* have been respectively placed preferably for each of the longer sides 361*a* of the base material 361, for each of the longer sides 362*a* of the base material 362, and for each of the longer sides 363*a* of the base material 363. However, the number of exposure hole portions may be 1 or 3 or more.

Figure 11A:
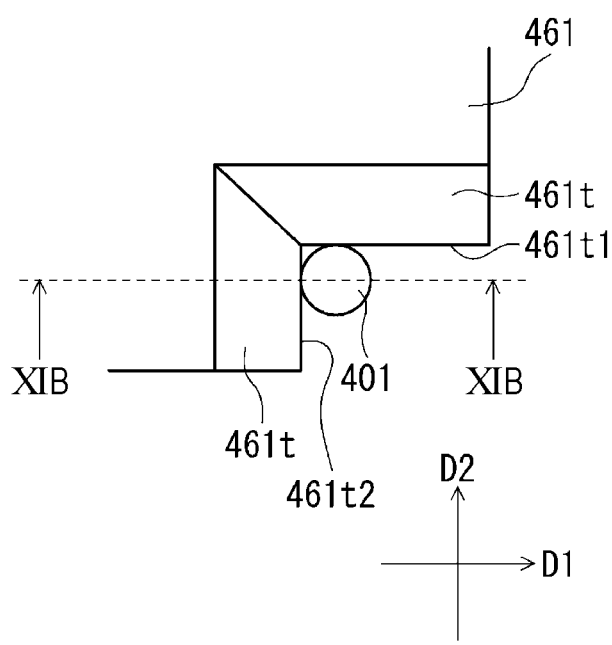
FIGS. 11A, 11B, 11C, and 11D each illustrate a relationship between a positioning pin and a cutout portion in the base material of a shield member in variations of the second embodiment.
Figure 11B:
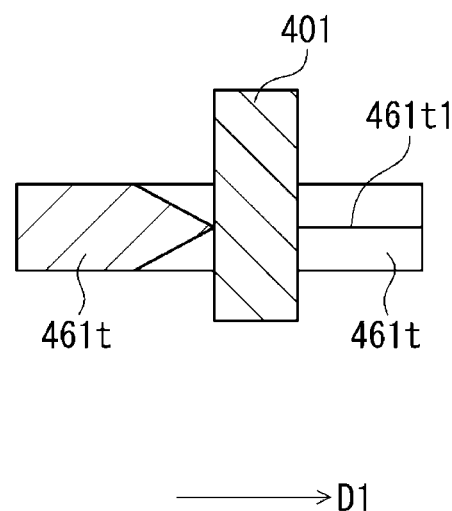
Figure 11C:
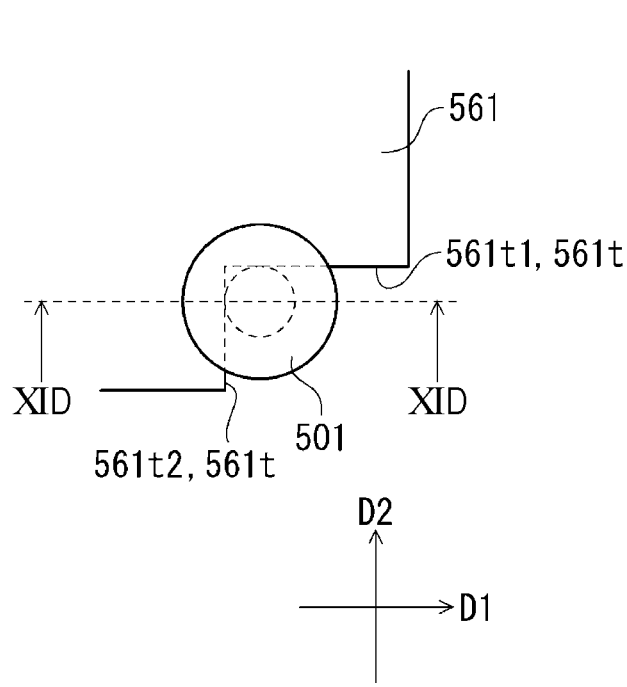
Figure 11D:
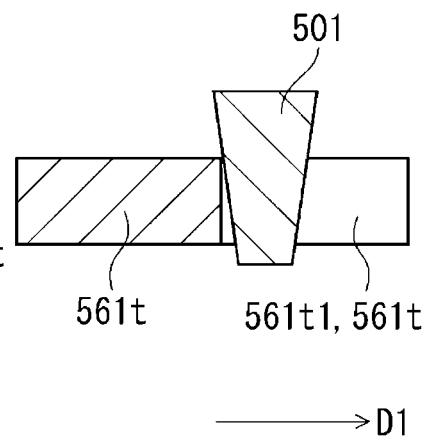

FIGS. 11A, 11B, 11C, and 11D illustrate relationships between positioning pins 401 and 501 and cutout portions 461*t* and 561*t* in the base materials 461 and 561, respectively, of the shield members in variations 6 and 7 of the second embodiment. FIG. 11A is a plan view illustrating a relationship between the positioning pin 401 and the cutout portion 461*t* in the base material 461 in variation 6. FIG. 11B is a sectional view along line XIB-XIB in FIG. 11A. FIG. 11C is a plan view illustrating a relationship between the positioning pin 501 and the cutout portion 561*t* in the base material 561 in variation 7. FIG. 11D is a sectional view along line XID-XID in FIG. 10C.

In variation 6 illustrated in FIGS. 11A and 11B, the cutout portion 461*t*, which is cut out in a rectangular shape, is formed at a corner of the base material 461 in a rectangular shape in plan view, as with the base materials 361, 362, and 363 in the second embodiment. As illustrated in FIG. 11B, this cutout portion 461*t* has two end faces, in a wedge shape, which are thinner toward their ends, and at the end of the wedge shape, ridges 461t1 and 461t2 are formed for each two end faces.

For the cutout portion 461t in this type of structure, the positioning pins 401 in a columnar shape is brought into line contact with the ridges 461t1 and 461t2. After the base material 461 has been insert-molded, a through-hole portion is formed at a position corresponding to the positioning pin 401 as in the second embodiment. Since the outline of this through-hole portion is brought into point contact with the cutout portion 461t, exposure of the cutout portion 461t can be limited to the ridges 461t1 and 461t2.

In variation 7 illustrated in FIGS. 11C and 11D as well, the cutout portion 561t, which is cut out in a rectangular shape, is formed at a corner of the base material 561 in a rectangular shape in plan view, as with the base materials 361, 362, and 363 in the second embodiment. This cutout portion 561t has an end face 561t1 extending along the first direction D1 and an end face 561t2 extending along the second direction D2.

In variation 7, the positioning pin 501 in a truncated cone shape is used to place the base material 561 so that the central axis of the positioning pin 501 is along the thickness direction of the base material 561 (up-down direction in FIG. 11D). In this placement, the outline of a through-hole portion formed at a position corresponding to the positioning pin 501 is brought point contact with the end face 561t1, which is on one side, on one line along the first direction D1, and is also brought point contact with the end face 561t2, which is on another side, on one line along the second direction D2. Thus, exposure of the cutout portion 561t can be limited to these portions.

In the description of the second embodiment, the support pins 301, 302, and 303 have been described as in a columnar shape. In practice, since the support pins 301, 302, and 303 need to be pulled out from the molded resin portions after the completion of molding, the support pins 301, 302, and 303 are machined so that their diameters are reduced toward their ends so as to be easily pulled out.

The present invention has been described with reference to the above embodiments, but the present invention is not limited to the above embodiments. It is possible to improve or change the present invention within the range of the object of improvement or the concept of the present invention.

What is claimed is:

1. A current detecting device comprising:
a bus bar;
a fastening member for fastening an external member to the bus bar:
a chassis that holds the bus bar and the fastening member in a mutual contact; and
a magnetic sensor disposed to face the bus bar, the magnetic sensor being capable of detecting a magnetic field generated when a current under measurement flows through the bus bar; wherein:
the external member is an external conductor that conducts current through the bus bar,
the chassis has a molded body made of resin material,
the bus bar has a fastening terminal portion at an end of the bus bar,
the fastening terminal portion has a connection surface and an anchor portion,
when the fastening terminal portion is viewed from the connection surface side, the anchor portion is disposed on the back side of the connection surface, and the anchor portion has an embedded surface facing the connection surface side,
the connection surface is exposed from a surface of the molded body so that it can come into contact with the external member, and
the embedded surface of the anchor portion is embedded in the molded body.

2. The current detecting device according to claim 1, wherein the connection surface is exposed in a state in which the connection surface protrudes beyond a portion, of the chassis, that covers the anchor portion.

3. The current detecting device according to claim 1, wherein:
the bus bar has a bent portion, which is bent, between the end at which the fastening terminal portion is disposed and another end opposite to the end; and
the magnetic sensor is disposed to face a position, on the bus bar, between the bent portion and the fastening terminal portion.

4. A current detecting device comprising:
a bus bar;
a magnetic sensor capable of detecting a magnetic field generated when a current under measurement flows through the bus bar;
a pair of shield members between which the bus bar and the magnetic sensor are interposed; and
a chassis made of a resin material, the chassis being formed integrally with a first shield member of the pair of shield members, the first shield member being positioned on a side close to the bus bar; wherein:
the first shield member has a base material having a metal plate-like body and also has a protecting portion made of a resin material, the protecting portion covering at least part of an end face of the base material, and
the first shield member has an exposed portion, at which the base material is exposed, at a place at which the first shield member faces the bus bar.

5. The current detecting device according to claim 4, wherein the exposed portion has a wide-width portion, the base material being exposed at the wide-width portion on an outside of a portion at which the exposed portion overlaps the bus bar when the exposed portion is viewed from the same side as the bus bar.

6. The current detecting device according to claim 4, wherein:
the base material has an extended portion continuous to the exposed portion, the base material being exposed at the extended portion; and
the protecting portion covers an end face of the base material so that at least the exposed portion and the extended portion are exposed.

7. The current detecting device according to claim 6, wherein:
the first shield member is insert-molded to an interior of the chassis; and
the chassis has a hole from which part of the extended portion is exposed.

8. A current detecting device comprising:
the current detecting device in claim 4; and
a fastening member for fastening an external member to the bus bar; wherein:
the chassis holds the bus bar and the fastening member in a mutual contact state,
the bus bar has a fastening terminal portion on the same side as an end of the bus bar, the fastening terminal portion being in contact with the external member, a connection surface, through which the fastening terminal portion is brought into contact with the external member, is provided so as to be exposed from the chassis, and the fastening terminal portion has an anchor portion embedded in the chassis, the anchor portion having a surface different from the connection surface.

9. A current detecting device comprising a sensor portion that comprises:

a plate-like bus bar;

a magnetic sensor placed so as to face a plate surface of the bus bar;

a pair of shield members placed at positions between which the bus bar and the magnetic sensor are interposed from both sides of a lamination direction of the bus bar and the magnetic sensor; and a chassis composed of a molded body of a resin material; wherein:

a first shield member of the pair of shield members, the first shield member being positioned on a side close to the bus bar, is insert-molded to an interior of the chassis, the first shield member being composed of a plate-like body, which is a polygon in plan view, a cutout portion being formed at each of at least two corners of the polygon, and the chassis has at least one through-hole portion, which is partially in contact with an end face formed by the cutout portion so as to extend in the lamination direction, and the cutout portion and an outline of the through-hole portion are in point contact with each other on a cross section along a plane parallel to a plate surface of the first shield member.

10. The current detecting device according to claim 9, wherein on the cross section along a plane parallel to a plate surface of the first shield member, the cutout portion and the outline of the through-hole portion are in point contact with each other at the same position on the cross section, regardless of the position on the cross section in the lamination direction.

11. The current detecting device according to claim 9, wherein:

the cutout portion has a plurality of end faces, and an outline of the through-hole portion is in point contact with each of the plurality of end faces on a cross section along a plane parallel to the plate surface of the first shield member.

12. The current detecting device according to claim 9, wherein:

the cutout portion has at least two end faces; and the through-hole portion is partially brought into contact with each of the two or more end faces forming the cutout portion.

13. The current detecting device according to claim 9, wherein:

the cutout portion has two end faces; and the through-hole portion is partially brought into contact with each of the two end faces forming the cutout portion.

14. The current detecting device according to claim 9, wherein a shape of a cross section taken by cutting the through-hole portion along a plane parallel to a plate surface of the first shield member is circular.

15. The current detecting device according to claim 9, wherein:

the first shield member is rectangular in plan view and has the cutout portion at each of the one pair of diagonal positions; and the chassis has the through-hole portion in correspondence to each of cutout portions.

16. The current detecting device according to claim 9, wherein:

the first shield member is rectangular in plan view and has the cutout portion at each of two pairs of diagonal positions; and the chassis has the through-hole portion in correspondence to each of cutout portions.

17. A current detecting device comprising:

a bus bar;

a magnetic sensor capable of detecting a magnetic field generated when a current under measurement flows through the bus bar;

a pair of shield members between which the bus bar and the magnetic sensor are interposed;

a chassis made of a resin material, the chassis being formed integrally with a first shield member of the pair of shield members, the first shield member being positioned on a side close to the bus bar, wherein the first shield member has a base material having a metal plate-like body and also has a protecting portion made of a resin material, the protecting portion covering at least part of an end face of the base material; and a substrate on which the magnetic sensor is mounted, wherein:

the chassis has:

a case in which the first shield member is insert-molded, and a cover that holds a second shield member, which is another of the pair of shield members; and the substrate is fixed to the case.

* * * * *